June 23, 1964 D. ANDRYCHUK 3,138,650
OPTICAL SYSTEM
Filed Jan. 22, 1962 2 Sheets-Sheet 1

Dmetro Andrychuk, Inventor.
Koenig, Pope, Senniger and Powers,
Attorneys.

June 23, 1964
D. ANDRYCHUK
3,138,650
OPTICAL SYSTEM
Filed Jan. 22, 1962
2 Sheets-Sheet 2
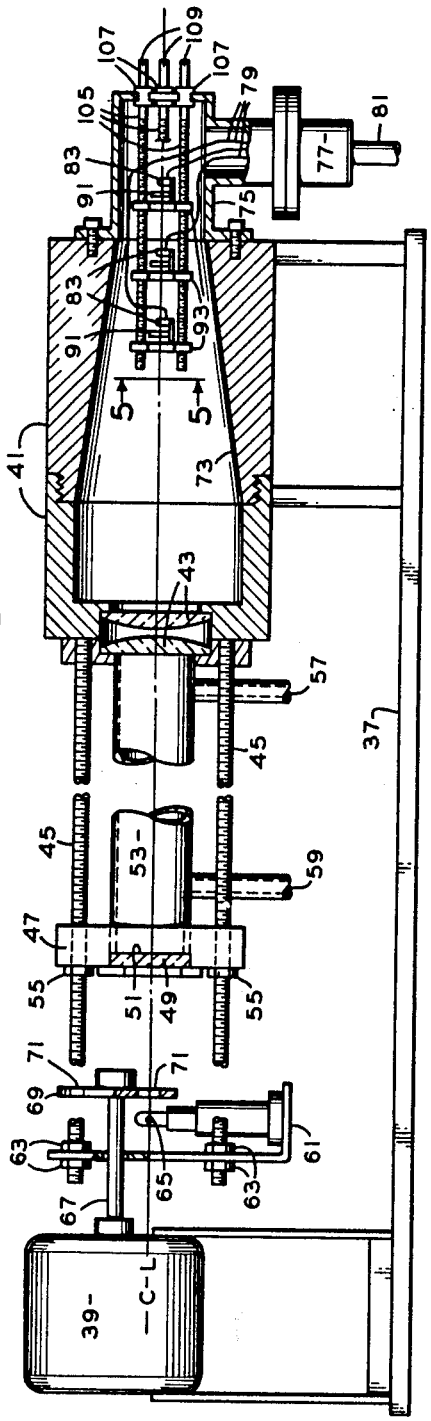

United States Patent Office 3,138,650
Patented June 23, 1964

3,138,650
OPTICAL SYSTEM
Dmetro Andrychuk, Richardson, Tex., assignor to Texas Instruments Incorporated, Dallas, Tex., a corporation of Delaware
Filed Jan. 22, 1962, Ser. No. 167,525
17 Claims. (Cl. 88—1)

This invention relates to optical systems and methods, and with regard to certain more specific features, to multiple-image optical systems for use in various analytical apparatus such as monochromators, spectrometers, pyrometers or the like for carrying out various analyses, such as multi-component stream analysis, temperature measurements and the like.

Among the several objects of the invention may be noted the provision of an optical system which will divide light from a single source into multiple real images or the like of said source, said system being operative with light in the range from ultraviolet to infrared, inclusive; the provision of an optical system of the class described which is operative without disadvantageous light-dispersing elements such as prisms, gratings or the like and which has a large light-gathering power; and the provision of an optical system of the class described which is useful in apparatus for surveillance processes as such as, for example, continuous liquid or gas stream component analysis, temperature measurements by determinations of energy radiated from a body in various frequency bands, and other analogous surveillance processes. Other objects and features will be in part apparent and in part pointed out hereinafter.

The invention accordingly comprises the steps and sequence of steps, elements and combinations of elements, features of construction and manipulation, and arrangements of parts which will be exemplified in the methods and structures hereinafter described, and the scope of which will be indicated in the following claims.

In the accompanying drawings, in which several of various possible embodiments of the invention are illustrated:

FIGURE 2 is a diagrammatic detail view of certain components shown in FIGURE 1;

FIGURE 3 is an axial section illustrating another form of the invention;

FIGURE 4 is an enlarged axial-section detail of a portion of FIGURE 3; and

FIGURE 5 is an enlarged cross section taken on line 5—5 of FIGURE 3.

Except as otherwise noted, corresponding reference characters indicate corresponding parts throughout the several views of the drawings.

Figure 1:
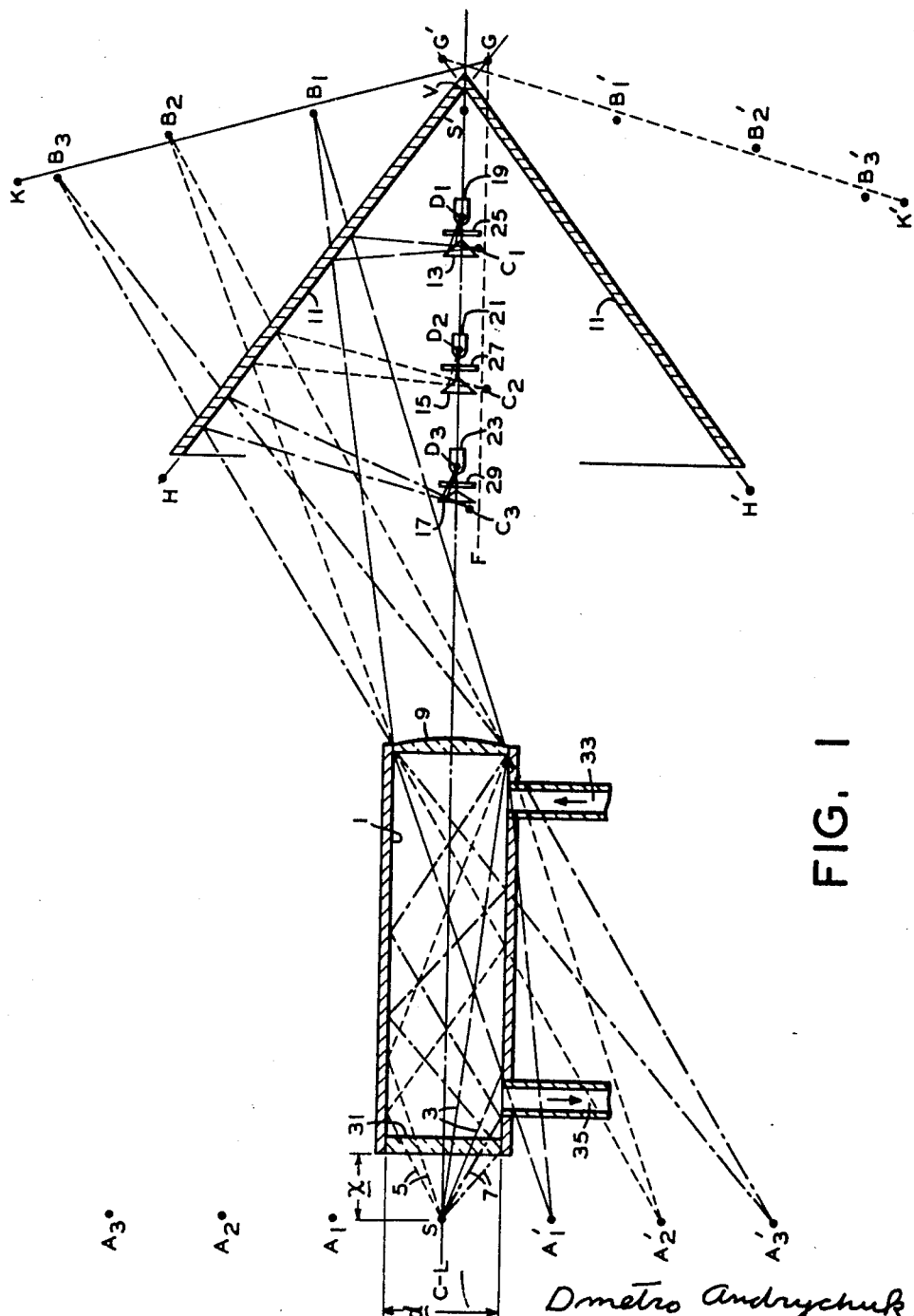
FIGURE 1 is an optical diagram illustrating one form of the invention by an axial section.

Briefly, the invention consists in an optical system composed of an internally reflecting tube adapted for reception at one end of a bundle of rays from an essential point light source adjacent one end thereof. The bundle of rays is polyconically reflected within the tube. At the other end of the tube is a focusing lens through which pass the polyconically reflected rays for focusing outside of the tube. The tube form is such that various polyconic segments of the bundle from the source have different numbers of reflections, respectively, whereby the lens is enabled to focus said segments, after polyconic reflections in the tube, toward individual real ring images of the source.

A hollow conical mirror is arranged to intercept the ring-focused segments and reflect them to several smaller conical mirrors. The latter are adapted to produce several spaced real point images of the light source or at least separate light concentrations. Light from each small conical mirror passes through an appropriate absorption filter before reaching the respective point image or concentration. The separately filtered point images or concentrations impinge upon light-sensitive electrical detectors providing signals of various intensities according to the energies being transmitted in various wave lengths determined by the filters. By means of any appropriate electrical system, the signals may be translated into quantitative signals adapted for comparisons and computations for analytical purposes, with or without the aid of automatic computers. The particular electrical circuit employed for dealing with the signals forms no part of the invention as such and is therefore not illustrated. Said reflecting tube may conveniently function as a chamber for containing fluid to be analyzed when the system is used as a chemical analyzer. It may also constitute an on-stream flow chamber for continuous analyzing operations adapted for industrial automation. The invention is also useful for both single-component and multiple-component fluid analyses. When used for temperature measurements of a source, the reflecting tube need not constitute such a chamber. The reflecting tube, focusing lens, conical mirrors and the detectors have a convenient coaxial arrangement, providing compactness.

Referring now more particularly to FIGURE 1, a point or concentrated light source is shown at S, located on a center line or optical axis C-L. The source S is located adjacent one end of a tube which, in the structural examples given herein, is in the form of a cylindrical mirror 1, disposed on the optical axis C-L. The reflecting surface of the cylindrical mirror 1 is on its inside. If the eye of an observer is placed at the end of the tube 1, opposite the source S, so as to sight the source S on the axis C-L, a series of concentric virtual ring images of the source S can be seen by the observer. The first virtual ring image is of a diameter twice that of the cylinder 1. Its points of apparent intersection with the paper plane are shown at traces $A_1$ and $A_1'$. It is formed when a conic segment of the polyconic sheaf of rays from source S undergoes a single reflection from the cylindrical mirror 1, as indicated by the rays 3 which are illustrated in half section by long dash lines. A second virtual ring image, four times the diameter of the cylinder 1, that apparently intersects the paper plane at traces $A_2$ and $A_2'$ can also be seen. This virtual ring image of light is produced by light from the source undergoing two reflections in the cylindrical mirror 1, as indicated by the rays 5 which are illustrated in half section by short dash lines. A third virtual ring image appears at six times the diameter of the cylinder and appears to intersect the plane of the paper at traces $A_3$ and $A_3'$. This ring is produced by light from the source S undergoing three reflections in the cylindrical mirror 1, as indicated by the rays 7 which are illustrated in half section by dot-dash lines.

The virtual rings shown by traces ($A_1$, $A_1'$), ($A_2$, $A_2'$) and ($A_3$, $A_3'$) may be referred to as multiple virtual ring images of the source S. They encircle the center line C-L. By placing a spherical or other suitable focusing lens at the outlet end of the tube 1, as shown at 9, real ring images of said virtual ring images ($A_1$, $A_1'$), ($A_2$, $A_2'$) and ($A_3$, $A_3'$) can be formed as shown by their traces at ($B_1$, $B_1'$), ($B_2$, $B_2'$) and ($B_3$, $B_3'$), respectively. The latter, in the absence of any interception of rays emanating from lens 9, are multiple real ring images of the source S.

There is also a real image point of the source S produced at point S' by the lens 9. The real ring image circles ($B_1$, $B_1'$), ($B_2$, $B_2'$), ($B_3$, $B_3'$) and the direct image point S' are not in the same plane, due to the curvature of field of the lens 9 which may be spherical and not corrected to produce a flat field. The image points $B_1$, $B_2$ and $B_3$ lie in the vicinity of a line such as GK. To condense the ring images ($B_1$, $B_1'$), ($B_2$, $B_2'$), ($B_3$, $B_3'$) into rings of real point images as illustrated by the single point shown at $C_1$, $C_2$, $C_3$, a conical mirror 11 having an inside reflective surface, is established such that a conical generator line GH therein intersects (in the plane of line GK) the angle FGK. Small conical mirrors having an outside reflective surface 13, 15 and 17 are suitably placed on the optical axis C-L so as to reflect points such as $C_1$, $C_2$, $C_3$ onto the optical axis, as shown at $D_1$, $D_2$, $D_3$. It will be understood that points $C_1$, $C_2$, $C_3$ are single traces in the proper plane of small real image circles around axis C-L. The second set of upper traces of these circles is not shown, to keep clear the various broken lines showing, for example, one-half of the ray directions in the plane of the paper. By rotating the ray system shown, all of the ray directions in the plane of the paper would appear. Additional rays out of the paper plane are similar, producing individual reflected polyconic systems, of which the broken lines shown are half-axial sections. Rotation entails the generation of a second reference line for points $B_1'$ $B_2'$, $B_3'$, as shown by broken line G'K'. A line from G' drawn parallel to line FG would pass in the same relation to upper traces (not shown) of the circles represented by $C_1$, $C_2$, $C_3$. All points on said small real image circles through $C_1$, $C_2$, $C_3$ are reflected to points $D_1$, $D_2$, $D_3$ by the coaxial mirrors 13, 15 and 17, respectively.

Thus it will be understood that the conical mirrors 13, 15 and 17 focus such small ring images on which $C_1$, $C_2$ and $C_3$ are points into the real image points $D_1$, $D_2$ and $D_3$, the latter being on the optical axis C-L, along with the unused point S'.

On FIGURE 1, the polyconic bundle sections 3, 5 and 7, after their respective single, double and triple reflections in the tube 1 and passage through the lens 9, are extended by broken lines to show the optical relationships between the point source S and its real point images $D_1$, $D_2$ and $D_3$. These images are polychromatic. Between the image point $D_1$, $D_2$ and $D_3$ and the respective mirrors 13, 15 and 17 are placed bandpass interference filters 25, 27 and 29, respectively. To obtain electrical signals according to the resulting intensities of bandpassed light at points $D_1$, $D_2$, $D_3$, photoelectric detectors 19, 21, 23 are placed at these points respectively. These measure the energies transmitted in the wave lengths passed by their respective filters. FIGURE 2 shows in enlarged form the typical relationship between a detector such as 19 operative at point $D_1$, the conical mirror 13 intercepting rays focused toward point $C_1$, and through the interposed interference filter 25. The filter-detector arrangements at points $C_2$ and $C_3$ are analogous, as suggested in FIGURE 1. It will be apparent to one skilled in this art that the filters 25, 27 and 29 may be replaced by a single disc-shaped body composed of concentric rings of filters, one filter for each bundle 3, 5 and 7 of light. Such a disc would be placed adjacent to the transparent diaphragm 31.

It will be apparent that the image brightness at points $D_1$, $D_2$, $D_3$ determines the energy available at the respective detectors 19, 21 and 23. This is substantial, in view of the large light-gathering power of the cylindrical mirror 1. Calculations show that, ignoring the filters, each of the point images $D_1$, $D_2$ and $D_3$ is adapted to receive more light than does the discarded direct image S'. This is because the cylindrical mirror in tube 1 gathers a bundle of light of very large solid angle from the source S. The light-gathering power is comparable to the light-gathering power of a lens having an aperture ratio of approximately $F/0.58$. The distance $x$ of the source S from the inlet end of cylindrical mirror 1, divided by the inside diameter $d$ of said cylindrical mirror 1, equals this ratio.

A conventional lens stop may optionally be used in connection with lens 9, in order to gain better definition when adjusted to smaller openings than shown, or to accommodate an additional fourth image such as $D_1$, $D_2$ or $D_3$, but its use in stopped-down adjustments will of course sacrifice some of the light-transmitting ability of the lens.

While for certain purposes the left-hand end of the cylindrical mirror 1 may be left uncovered, it may be enclosed by a transparent, for example glass, diaphragm 31 and provided with an inlet connection 33 and an outlet connection 35 for circulating a stream of any gaseous or liquid fluid to be analyzed.

Concerning operation, a fluid mixture to be surveyed in regard to the concentration of its known components is circulated through tube 1. Filters 25, 27, 29 are chosen to pass narrow bands of wave lengths according to the absorption bands of the components of the mixture. Thus signals are obtained continuously which are functions of the concentrations of the components. If there is no interference between the transmission bands, then the electrical output of each detector 19, 21 or 23 is a unique function of the concentration of that constituent of the substance which it monitors. If the transmission bands overlap, corrective computations are called for which may be supplied by computers used in connection with the cricuit. The system may be used simultaneously and continuously to monitor up to three components in one sample circulating through the tube. More than three components may be monitored if provision is made for an additional detector assembly on the axis C-L of mirror 11.

Although S has been described as a real light source, it will be understood that it may be a point image produced from one or more other optical system operating at the same or different wave lengths. Thus S may be a real image composed of infrared, visible and ultraviolet regions of radiation simultaneously introduced at S from several optical systems. It will also be understood that the invention is applicable to monitoring batches of materials located in the cylindrical mirror 1, as distinguished from materials being circulated therethrough.

The system is also applicable to temperature investigations concerning the light source S. In such event, it is not necessary to employ the fluid-containing diaphragm 31 or the circulating pipes 35 and 33. The device is then operative as a radiation pyrometer, wherein each detector 19, 21 or 23 measures the energy transmitted in the wave band passed by its respective filter 25, 27 or 29. Since this use of the invention permits the determination of the quantity of energy given off by a radiating body in particular frequency bands, it is useful for various temperature investigations because the quantity of energy given off in particular frequency bands is determined by the temperature of a radiating body.

In FIGURES 3 and 4 is shown another form of the invention wherein numeral 37 indicates a base which supports a motor 39 at one end and a two-part block 41 at the other end. The left-hand part of the block 41 supports a compound lens 43 and several threaded posts 45. The latter pass freely through holes in a slide block 47. The block 47 contains a light-transmitting window 49 in an opening 51. It is slidable on the posts 45 for the purpose of holding (with suitable sealants) an interiorly polished tube or cylindrical mirror 53 against the lens combination 43. Nuts 55 on the threaded posts 45 serve to keep the block 47 in any given position required to hold the tube 53. The tube 53 has inlet and outlet circulating tubes 57 and 59, respectively. By means of this arrangement, cylindrical tubes such as 53 of different lengths as desired may be clamped in position. At 61 is shown a bracket slidable on the threaded post 45 and held in any desired adjusted position by means of lock nuts 63. The bracket 61 carries an infrared light source 65. The motor 39 has a drive shaft 67 passing through an opening in the bracket 61 and carrying a perforated plate 69. The plate 69, when driven by the motor 39, operates as a chopper for the light rays passing from the source 65 to the cylindrical mirror 53. The appropriate openings 71 in plate 69 are of a size and located at a radius designed intermittently to pass light. Thus the plate 69 constitutes a beam chopper.

The right-hand element of the block 41 is formed as a concave conical internal mirror 73 which serves a purpose similar to that above described for mirror 11 in FIGURE 1, except that its conical apex angle is smaller. Attached to the right-hand end of the block 41 is a cup-shaped support 75, containing an outlet 77 for wires 79 leading to a cable 81. The wires connect with detectors which correspond to detectors 19, 21 and 23 of FIGURE 1. These detectors are all numbered 83 in FIGURE 3. All are similarly mounted, so that the descriptions of the mounting for one will be sufficient for all.

Referring to FIGURE 4, detector 83 is shown as being mounted on a bracket 89 which carries an interference filter 91. The bracket 89 is supported on a diaphragm 93 in which is a conical opening 95 having an internally reflecting conical surface 97 for receiving from the mirror 73 a conic beam of rays 99 and reflecting the ring image formed thereby through the filter 91 to the detector 83. Dots 100 represent paper-plane traces of the ring image referred to. It will be understood that the dotted lines 99 illustrating the beam show only one side of it, and that actually the beam is of a conic form that would be obtained by rotating the lines 99 around the center line C-L. As FIGURE 3 shows, in this form of the invention, the small conical mirrors 97 are concave. In the FIGURE 1 form of the invention, the corresponding small conical mirrors 13, 15 and 17 are convex. This difference is called for by the difference in the respective apex angles employed for the mirrors 11 (FIGURE 2) and 73 (FIGURE 3).

It is desirable that the position of each assembly of small conical mirror, filter and detector shall be axially adjustable, and means is provided for this purpose as shown in FIGURES 3 and 5. Thus each diaphragm 93 is provided with three legs 90, 92 and 94, as illustrated in FIGURE 5. Each diaphragm has, in two of its legs, plain clearance holes such as 101 and in another leg a threaded driving hole such as 103. In the middle diaphragm 93 (FIGURE 3), the driving hole 103 (FIGURE 5) is in leg 90 and the clearance holes are in legs 92 and 94 (FIGURE 5). For the right-hand diaphragm 93 (FIGURE 3), the corresponding driving hole 103 is placed in leg 92 and the clearance holes are in legs 90 and 94 (FIGURE 5 changed to meet these requirements). In the left-hand diaphragm 93 of FIGURE 3, the driving hole 103 is in leg 94 and the clearance holes 101 are in the legs 90 and 92 (FIGURE 5 changed to meet these requirements). Three threaded supporting screws 105 are supported in bearings 107, being provided with outside screwdriver slots 109 for individually rotating them. Thus by individually rotating the screws 105, each individual diaphragm 93 may be independently adjusted axially, along with its respective filter and detector. This arrangement allows each conical mirror 97 to be brought into proper position for properly receiving its conic beam of rays such as 99.

The operation of the form of the invention shown in FIGURE 3 is similar to that already described in connection with FIGURE 1, except for the feature of the optional motor-driven light chopper 69. An advantage of using a chopper is that the chopped light signal as received by the detectors can be amplified by a suitable conventional bandpass amplifier having a bandpass center frequency matching the chopping frequency so that the effect of any radiation other than that from the source 65 can be eliminated. Thus the apparatus will be responsive only to the intensity of the infrared source 65 and not to that of background radiation reaching the tube 53. If there is no problem concerning the entrance of extraneous radiation into the optical system, then there is no need for a chopper, which is the case in the form of the invention shown in FIGURE 1.

In view of the above, it will be seen that the present optical system has the following advantages:

(1) It produces from an essentially point source several widely separated high-intensity point images or light concentrations.

(2) The strong effect of high-intensity concentrations on the detectors requires less sensitive detectors and less signal amplification in any connected circuit.

(3) The ample distance between images provides ample spaces for locations of the assemblies of conical mirrors, filters and detectors.

(4) The use of a tube or cylindrical mirror for transmitting light from the source through the focusing lens in connection with a hollow concave mirror results in a large light-gathering capacity of the system.

(5) The tube or cylindrical mirror provides a convenient chamber for batch charging or circulatory charging of fluid to be monitored.

(6) The system is useful for radiation from the infrared through the ultraviolet, inclusive, and is adaptable for use with any circuit capable of operating from several detectors feeding several variable signals into it.

(7) The system provides for monitoring concentrations of various components in a mixture and for the determination of the quantities of energy given off by a radiating body in one or more frequency bands.

It will be apparent from the above that one reason for the small solid conical mirrors 13, 15, 17 (FIGURE 1) and the small hollow conical mirrors 95 (FIGURE 3) is that the most economical lens means 9 (FIGURE 1) or 43 (FIGURE 3) do not have flat fields. Another is to provide convenient means for sending light through flat filters. However, it is possible at some cost to construct flat field lenses. In such event the ring foci ($B_1$, $B_1'$), ($B_2$, $B_2'$) and ($B_3$, $B_3'$) become coplanar and lines such as GK and G'K' (FIGURE 1) become collinear, passing through the point S'. Then the line V—H bisects a 90° angle between the center line C-L and such collinear lines. Thus, the apex angle of the conical mirror (FIGURE 1) becomes 90°. In that case the ring foci represented by point $C_1$, $C_2$, $C_3$ constrict to points lying on the center line C-L. This dispenses with the need for the conical mirrors such as 13, 15 and 17. The detectors such as 19, 21 and 23 are then placed with their sensitive points at the locations of focal points so established on the line C-L by direct reflection from the large conical mirror. The required filters then need to be of appropriate forms to intercept the bundles of rays passing from the large hollow mirror to the focal points on the center line. This point is mentioned to show that while the small conical mirrors are important features of the invention, under some conditions their use may be dispensed with. Furthermore, suitable operation is often obtainable with a curved field and no conical mirrors since the inaccuracy caused thereby is oftentimes smaller than the detection area of a detector. Of course, if the inaccuracy is larger than the detection area of the detector, there is only lost a part of the signal and the apparatus will still operate satisfactorily.

Although the embodiments above described each have a filter for each detector in order to cause each detector to respond only to selected wavelengths, this operation may also be accomplished by incorporating suitable dispersing means into the system (see Journal of Optical Society, August 1954, article entitled "The Axicon: A New Type of Element," by John McLeod). More particularly, a conical prism or a circular transmitting diffraction grating may be used in place of or adjacent to the lens 31 (FIGURE 1). Thus, each bundle 3, 5, 7 of radiation from the source S is thereby dispersed and its wavelength components are accordingly resolved spatially and reflected to a discrete position along the axis FG so that a detector placed along that axis is exposed only to those components which are reflected to its position. Accordingly, for this operation it is preferred that the conical reflector 11 be adjusted for providing focus along the center line C-L (i.e., $C_1$, $C_2$ and $C_3$ fall on C-L) and the conical reflectors 13, 15 and 17, along with filters 25, 27 and 29, be removed so that the detector $D_1$, $D_2$ and $D_3$ may be placed along the center line for detecting selected wavelength bands of radiation.

Moreover, dispersion may be accomplished by replacing the conical reflector 11 with a conical reflecting diffraction grating comprised of adjacent frustums centered on the center line C-L of conical diffraction grating(s), one frustum of reflecting diffraction grating for each bundle of rays $B_1$, $B_2$ and $B_3$.

In view of the above, it will be seen that the several objects of the invention are achieved and other advantageous results attained.

As various changes could be made in the above methods and constructions without departing from the scope of the invention, it is intended that all matter contained in the above description or shown in the accompanying drawings shall be interpreted as illustrative and not in a limiting sense.

What is claimed is:

1. An optical system comprising an internally reflecting tube which is adapted to receive at one end and reflect therethrough different portions of a bundle of rays from a radiation source adjacent said one end, focusing means at the other end of said tube adapted to focus the different internally reflected portions of the bundle from within the tube toward different real images each positioned in a different focal region outside of the tube, and reflecting means external to the tube positioned to intercept and reflect said differently focused rays into smaller real images.

2. An optical system according to claim 1 including radiation filter means interposed in the rays between said smaller real images and said external reflective means.

3. An optical system comprising an internally reflecting cylinder which is adapted to receive at one end and reflect therethrough polyconic portions of a bundle of rays from a radiation source adjacent said one end, lens means at the other end of said cylinder adapted to focus the internally reflected polyconic portions of the bundle of rays from within the tube toward different real image rings outside of the tube, and a reflecting conical mirror positioned to intercept and reflect the differently ring-focused rays to different focal regions of radiation concentration.

4. The optical system according to claim 3, including radiation filter means interposed in the rays between said focal regions and said conical mirror means.

5. The optical system comprising an internally reflecting cylinder which is adapted to receive at one end and reflect therethrough polyconic portions of a bundle of rays from a point source of radiation opposite said one end, a condensing lens at the other end of the tube adapted to focus the different internally reflected polyconic portions of the bundle from within the tube toward different ring foci outside of the tube, an internally reflecting conical mirror located opposite said other end of the tube with its reflecting interior facing said lens and extending to intercept and polyconically reflect the ring-focused rays, and spaced externally reflecting mirrors placed to receive the polyconically focused rays as reflected by said conical mirror and to reflect them to foci of real point images of the source.

6. The optical system according to claim 5, including radiation filter means interposed in the rays between each of said spaced externally reflecting mirrors and said real point images.

7. The optical system comprising an internally reflecting tube located upon an optical axis and adapted to receive at one end and reflect therethrough different portions of a bundle of rays from a point source opposite said one end, a lens located on said axis and at the other end of the tube adapted to focus the different internally reflected portions of the bundle of rays from within the tube toward different circles which surround said axis outside of the tube, an internally reflecting conical mirror located on said axis and opposite said other end of the tube with its internally reflecting portion facing said lens and extending to intercept and reflect the focused rays toward smaller circles surrounding said axis, and spaced internally reflecting mirrors located on said axis to intercept the rays as reflected by said internally reflecting conical mirror and to reflect said rays away from said smaller circles to focal concentrations substantially on said axis.

8. The optical system according to claim 7, wherein said spaced mirrors are externally reflecting.

9. The optical system according to claim 7, wherein said spaced conical mirrors are concave.

10. The optical system for producing multiple real images of a point source of radiation, comprising an internally reflecting cylindrical tube having a lens at one end, said tube being positioned to receive a conical bundle of radiation at said one end of said tube from the point source through the lens at the other end of said tube, the source, the tube and the lens means being located on a common optical axis, said tube being adapted to produce different whole numbers of reflections from different polyconic portions of said bundle of rays from said point source, said lens being adapted to focus said differently reflected polyconic portions of said bundle of rays toward different circles concentrically surrounding said axis, and an internally reflecting conical mirror located concentrically around said axis with its reflecting side facing said lens and of extent adapted to intercept and reflect toward said axis the rays differently focused by said lens, and additional spaced externally reflecting conical mirrors located on said optical axis adapted to receive differently focused rays reflected from said internally reflecting conical mirror and to direct said rays to form spaced real point images of the source on said axis.

11. The optical system according to claim 10, wherein said lens forms a fluid-containing head on its end of the tube and including a radiation-transmitting diaphragm enclosing the opposite end of the tube adjacent said point source of radiation, thereby to form a chamber for a fluid adapted to be traversed by radiation passing through the tube.

12. The optical system according to claim 11, including inlet and outlet connections for establishing a circulation of said fluid through the tube.

13. The optical system according to claim 10, including a light-sensitive electrical detector at each of said real point images and an absorption filter located between each additional externally reflecting conical mirror and its respective real point image.

14. The optical system according to claim 13, including radiation chopping means in the bundle of radiation from said point source.

15. The optical system according to claim 13, including supporting means for relatively fixing each detector, filter and its respective additional externally reflecting conical mirror, and means adapted individually to adjust each such supporting means relative to the other.

16. Optical apparatus comprising a hollow interiorly reflecting cone, means for supporting said cone, a coaxial focusing lens opposite said cone for admitting radiation thereto, an interiorly reflecting tube in a coaxial position with respect to said lens, means for clamping said tube, a radiation source, a rotatable perforated chopper disc mounted between said source and said tube for movement of the perforations of said chopper across the common axis of said tube, lens and cone, means adjustably mounting said radiation source for movement in a direction along said axis, a plurality of reflecting cones, a plurality of electrical detectors and a plurality of radiation filters, a plurality of supports, each of said supports mounting along said axis one of said reflecting cones with one of said electrical detectors and one of said radiation filters supported therebetween, and means adapted independently to adjust each of one of said supports.

17. Optical apparatus according to claim 16, wherein said additional reflective cones are of annular forms having concave reflecting surfaces.

No references cited